June 10, 1969   A. VOGT   3,448,810
PITCH CONTROL APPARATUS FOR HELICOPTER ROTORS
Filed May 17, 1966

INVENTOR
ALFRED VOGT

By Michael S. Striker
Attorney

United States Patent Office 3,448,810
Patented June 10, 1969

3,448,810
PITCH CONTROL APPARATUS FOR HELICOPTER ROTORS
Alfred Vogt, Friedrichshafen-Fischbach, Germany, assignor to Firma Ing. Josef Wagner, Friedrichshafen-Fischbach, Germany
Filed May 17, 1966, Ser. No. 550,804
Claims priority, application Germany, May 17, 1965, W 39,166
Int. Cl. B64c 27/10, 27/72
U.S. Cl. 170—135.26                                           8 Claims

ABSTRACT OF THE DISCLOSURE

The pitch of the blades of two counterrotating helicopter rotors is either adjusted in the same sense, or in opposite senses to obtain simultaneous pitch increase, or decrease, of both sets of blades; or increase of the pitch of one set, and decrease of the pitch of the other set, or vice versa, by connecting the adjusting means by control levers which pivot to obtain different adjustments, and are blocked for obtaining the same adjustment of the two sets of blades.

---

The present invention relates to a pitch control apparatus for the rotor blades of a helicopter, and more particularly to apparatus for adjusting the pitch of the blades of two contrarotating coaxial helicopter rotors.

Apparatus is known for adjusting the pitch of the rotor blades of helicopters of this type cyclically during each revolution, and also collectively for producing the same, or different pitch of the blades of the respective rotors.

The controlled cyclic variation of the pitch of the rotor blades is related to the simultaneous rotary and translatory movement of the rotor blades, and serves the steering of the helicopter about longitudinal and transverse axes, whereas the collective variation of the pitch of the rotor blades to the same pitch produces different lifting forces as required for altitude control, whereas the differential pitch adjustment serves the steering of the helicopter about its vertical axis and determines the direction of flight.

The steering effect is caused by the different reaction torques produced in the drive means by the collectively adjusted different angular positions of the rotor blades so that the difference between the torques causes turning of the helicopter about its vertical axis in the desired direction.

In accordance with the prior art, each rotor is associated with a wobble plate mechanism which includes a non-rotatable but angularly displaceable guide part, and a rotary part mounted in the guide part for angular movement with the same, and rotating at the same rotary speed and in the same direction as the associated rotor. The angular tilting motion of the wobble plates is transmitted by links and levers to the pitch adjusting means of the rotor blades, and effects an adjustment about the longitudinal blade axes.

The wobble plates are also shiftable in the direction of the axis of rotation of the rotor for the purpose of obtaining a collective adjustment of the rotor blades. If the wobble plates are displaced in the same manner, the same variation of the collective pitch of the blades of the individual rotors takes place for the purpose of controlling the altitude, while a different or relative displacement of the wobble plates causes different collective pitches of the rotor blades of the two rotors so that the drag of the rotor having higher pitch is greater and provide a torque differential causing the fuselage to turn about an approximately vertical axis.

The rotary parts of the wobble plate mechanisms are adjusted, guided and displaced by the respective non-rotatable tiltable guide parts which determine the angular position of the rotary parts in relation to the axis of rotation of the rotors, and also the angular position of the rotor blades.

The guide part of one wobble plate mechanism is controlled by the pilot, or by an automatic flight control apparatus, and is also connected with the guide part of the other wobble plate mechanism by suitable linkages so that upon adjustment of one guide part of one wobble plate mechanism, the guide part of the other wobble plate mechanism is also adjusted. In this manner, the rotary parts of the two wobble plate mechanisms are also adjusted, for example, angularly displaced or axially shifted.

It is known from the French Patent 936,071 and from the U.S. Patent 2,829,721 to arrange the wobble plate mechanisms below the rotor, and to adjust the blades of the upper rotor by the lower wobble plate, and of the lower rotor by the upper wobble plate. The tilting and wobbling motion, as well as the axial translatory movement of the rotary part of the lower wobble plate is transmitted to the blades of the upper rotor by links which are located in the interior of the hollow shaft driving the upper rotor. The links connecting the guide parts of the two wobble plate mechanisms with each other extend parallel to this shaft, and place and hold the guide parts in the desired tilted and axially displaced positions.

The wobbling and translatory axial movements of the rotary part of the upper wobble plate mechanisms, are transmitted by links and levers to the blades of the lower rotor.

For the purpose of the differential collective adjustment of the pitch of the rotor blades of the two rotors either additional links and stationarily mounted double-armed levers are provided which cause the relative movement between the two wobble plates, as described in the French Patent 936,071, or the connecting links of the guide parts are connected to a guide part by double-armed levers whose fulcrum pins are mounted for sliding movement along stationary guideways, as described in the U.S. Patent 2,829,721. The control apparatus of these known constructions are rather complicated, and the comparatively long links located within the upper hollow rotor shaft are out of sight, and cannot be inspected and serviced.

In another construction according to the prior art, as disclosed in the U.S. Patent 2,481,748, the upper wobble plate mechanism is arranged between the rotors, and the lower wobble plate mechanism is arranged below the lower rotor. The non-rotatable guide part of the lower wobble plate mechanism is connected with the pilot controlled steering devices, or with an automatic flight control apparatus, and effect the adjustments of the rotors and blades to the required inclined and displaced positions.

The rotary part of the lower wobble plate mechanism, which rotates at the same speed and in the same direction as the lower rotor, is connected by links with the guide part of the upper wobble plate mechanism so that the same also rotates at the rotary speed and in the direction of the lower rotor, while other links connect the rotary part of the lower wobble plate mechanisms with the blades of the lower rotor for adjusting the angular positions of the blades in relation to the blade axes, and thereby the pitch of the blades.

The rotary part of the upper wobble plate mechanism rotates at the rotary speed and in the direction of the upper rotor, and is connected by links and double-armed levers with the blades of the upper rotor for adjusting the pitch of the same.

The fulcrum pins of the double-armed levers, which serve the collective adjustment of the rotor blades, are mounted on a link which is located in the hollow drive shaft of the upper rotor and is shiftable in the direction of the rotor axis. For the differential collective adjustments of the blades of the two rotors for changing the direction of flight, a displacement of the lower wobble plate mechanism in axial direction of the rotors is required. As a result, the blades of the lower rotor are adjusted in one direction, and the blades of the upper rotor are adjusted in the opposite direction due to the fact that the ends of the double-armed levers move in opposite directions when controlling the respective links.

The uniform collective adjustment of the blades of the two rotors is obtained by axial displacement of the linkage which is located within the rotor shaft, while the lower wobble plate mechanism is shifted at the same time, so that both wobble plate mechanisms, and also the fulcrum pins of the double-armed levers mounted thereon are shifted in the direction of the axis of rotation in such a ratio that the different adjustments compensate each other and the collective pitch of the blades of the two rotors are adjusted to the same pitch. The control apparatus is very complicated, and is difficult to inspect and service due to the position of the steering link in the interior of the upper hollow rotor shaft.

It is one object of the invention to improve the pitch control apparatus for the blades of helicopters, and to provide a control apparatus of comparatively simple construction, comprising only few parts, and being easily inspected and serviced.

It is another object of the invention to provide a simple and efficient construction for adjusting collectively but differentially the pitch of the blades of two coaxial rotors of a helicopter.

With these objects in view, the present invention is concerned with the improvement of a control apparatus of the type in which the upper wobble plate is located between the rotors, the lower wobble plate is located below the lower rotor, and the wobble plates are connected to each other by linkages which transmit tilting movements and axial movements between the wobble plates.

In accordance with the present invention, adjustable intermediate control means are pivotally mounted on the rotary part of the lower wobble plate, and are connected with links acting on the upper wobble plate, while being controlled by a steering apparatus determining the direction of flight. In the arrangement of the invention, links located outside of the rotor shafts connect the wobble plates, and transmit not only the cyclical adjustment, but also the collective uniform and differential adjustments of the rotor blades. No control devices are required in the interior of the upper rotor shaft, and the construction is simple and requires only a few parts.

A control apparatus of the invention is applied to a rotary wing helicopter including coaxial contrarotating first and second rotors having first and second blade means, respectively, mounted for turning pitch adjustment movement about the respective blade axes, and having first and second adjusting means for adjusting the pitch of the first and second rotors.

One embodiment of the invention comprises first and second wobble plate mechanisms respectively including first and second guide parts mounted for angular movement, and first and second rotary parts mounted in the first and second guide parts mounted for angular movement with the same; means connecting the first rotary part and thereby the first guide part with the first adjustment means for angular movement; linkage means connected with the first guide part; control means, preferably control lever means pivotally mounted on the second rotary part and connected with the linkage means; operating means connected with the second guide part for angularly displacing the same with the second rotary part and the control lever means; and actuating means connected with the control lever means and having a first position for blocking movement of the control means relative to the second rotary part so that the operating means move the second guide part, the second rotary part, the control lever means, and the linkage means together. The actuating means are movable to a second position for turning the control lever means so that the linkage means are moved by the same whereby the first adjusting means are operated to increase, or decrease, the pitch of the first blades.

In the preferred embodiment of the invention, first linkage means connect the first guide part with the control lever means, while second linkage means connect the control lever means with the adjusting means. When the actuating means block movement of the control lever means, the first and second linkage means are moved by the operating means together so that the first and second adjusting means are simultaneously operated to increase or decrease the pitch of the first and second blade means, whereas when the actuating means turn the control lever means, the first and second linkage means are moved in opposite directions by the control lever means whereby the first and second adjusting means are simultaneously operated to increase, or decrease, respectively, the pitch of the first blades while decreasing, or increasing, respectively, the pitch of the second blades.

In the preferred embodiment of the invention, the rotary part of the lower wobble plate mechanism has arms on which double-armed control levers are mounted, and first links connect the control levers with the guide part of the upper wobble plate mechanism, while second links connect the control levers with the adjusting means for the blades of the lower rotor. The actuating means include a hydraulic motor for shifting a sleeve on the shaft of the lower rotor in axial direction. A lever is mounted on the sleeve for pivotal movement and connected by a pair of links to the rotary part of the lower wobble plate mechanism and to the control lever. As long as the actuating means are held immovable by the hydraulic motor, or by a corresponding mechanical motor, the control levers cannot turn, and the shifting of the lower wobble plate mechanism in axial direction by simultaneous movement of all actuating means connected thereto causes uniform collective adjustment of the blades. Turning of the control levers causes opposite movement of the first and second links and consequently turning of the blades of the two rotors in opposite directions. During such differential collective adjustment, the rotary part of the lower wobble plate mechanism remains in its axial position. Due to the fact that the first and second links are connected to the control levers in the preferred embodiment of the invention, the blades of the upper and lower rotors are not only turned relative to each other, but at the same time in opposite directions upon operation of the actuating means and the displacement of the sleeve.

For the equal collective adjustment of the pitch of the blades of the upper and lower rotors, the sleeve and the lower wobble plate mechanism are shifted together in the same axial direction so that the control levers do not turn and the upper wobble plate mechanism is shifted the same distance as the lower wobble plate mechanism which is controlled by the pilot or by an automatic pilot for the purpose of varying the altitude of the helicopter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
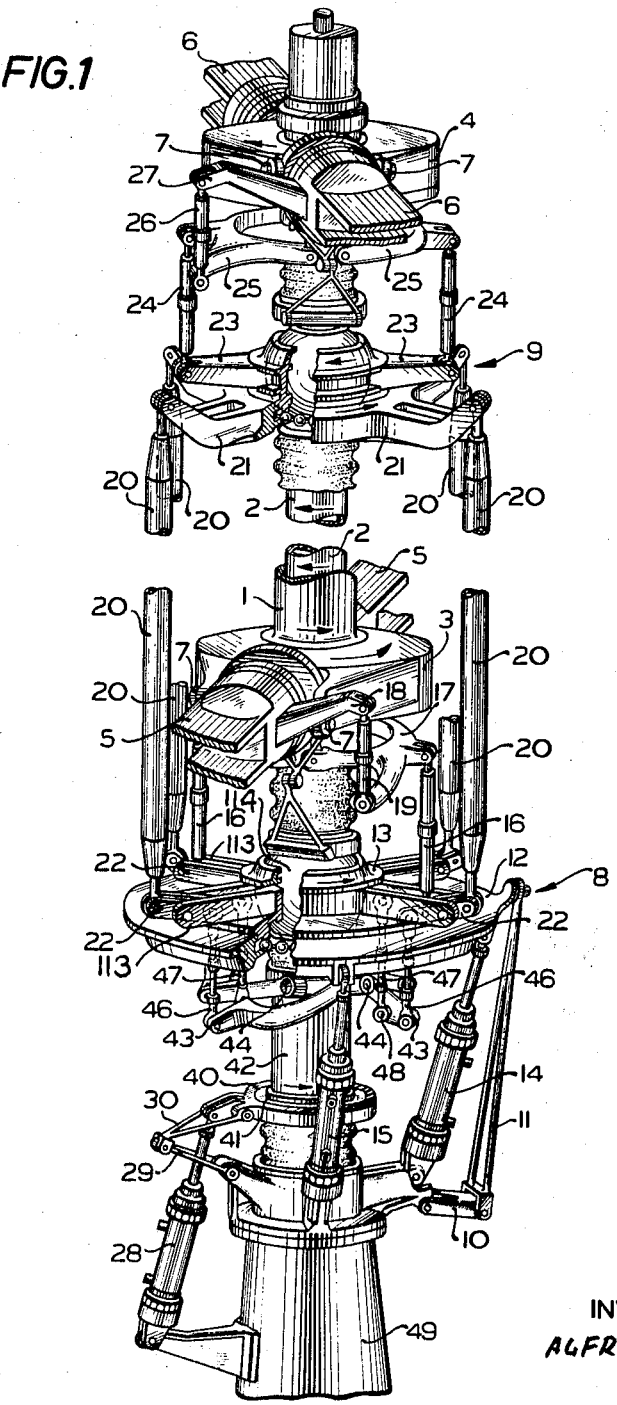
FIG. 1 is a fragmentary perspective view illustrating a control apparatus according to the present invention.
Figure 2:
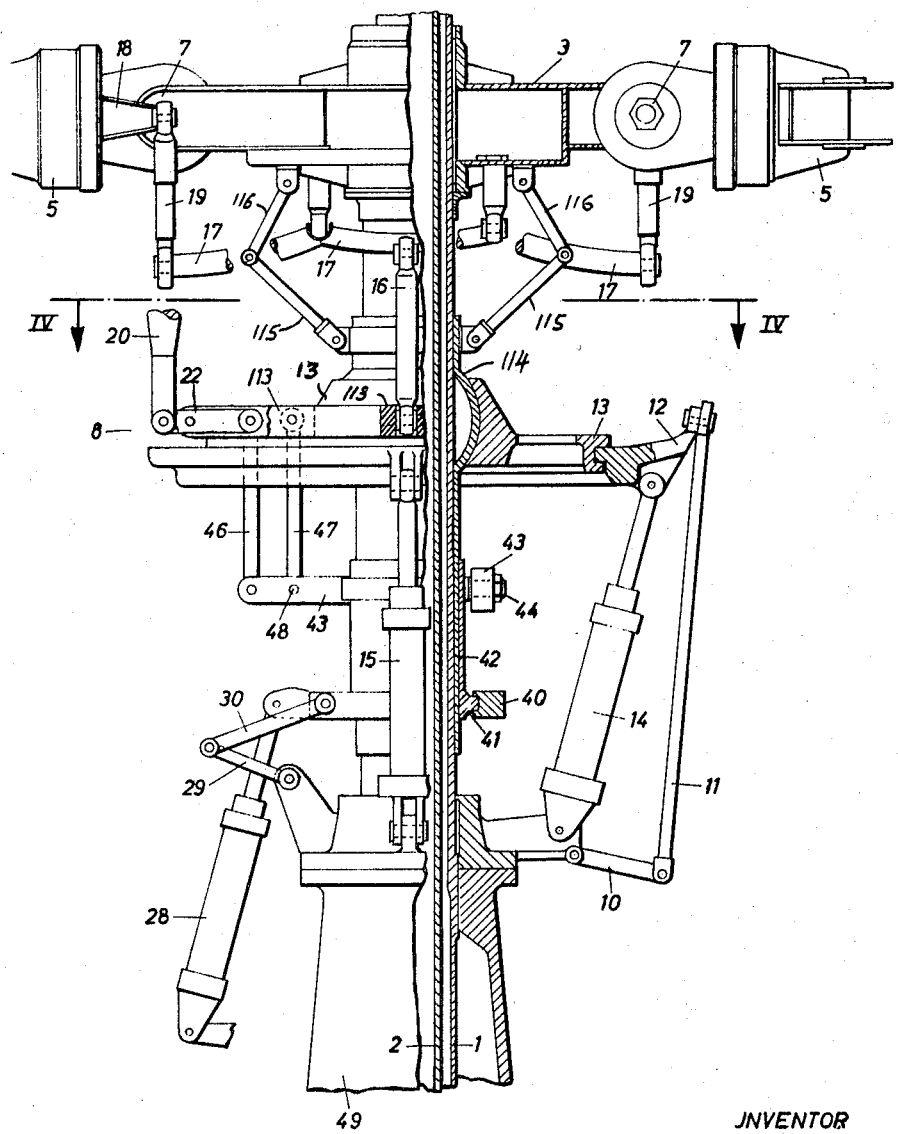
FIGS. 2 and 3 are longitudinal axial sectional views of the lower and upper parts of the apparatus.
Figure 3:
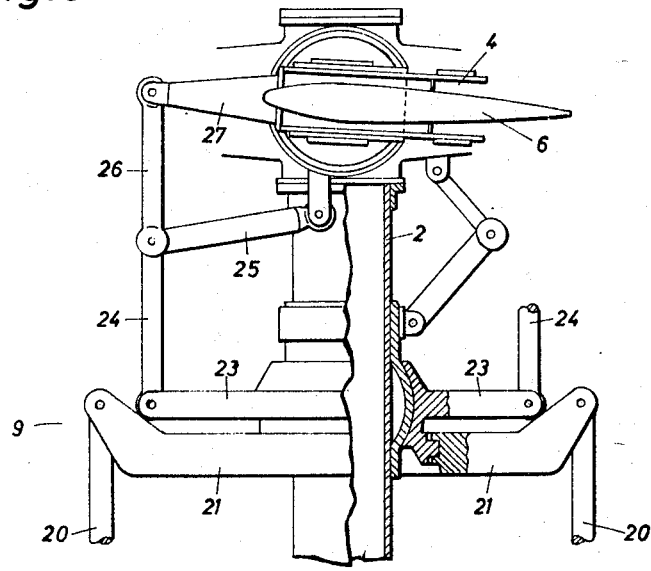
Figure 4:
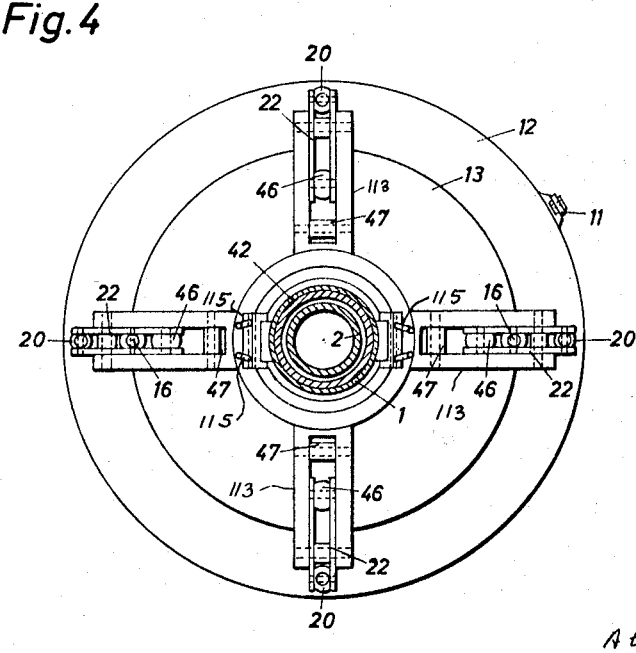
FIG. 4 is a cross-sectional view of the apparatus.

Referring now to the drawings, an inner shaft 2 carries a rotor head 4, and an outer hollow shaft 1 carries a lower rotor head 3. Shafts 1 and 2 are driven in opposite directions of rotation by conventional drive means, not shown. Well known constructive features of the helicopter are not illustrated in the drawing for the sake of simplicity, and are similar to the construction disclosed in the U.S. Patents 2,481,748 and 2,829,721.

Rotor heads 3 and 4 carry rotor blades 5 and 6 which are mounted for angular adjustment about horizontal axes 7, and for pitch adjustment about radial axes of blades 5 and 6. Adjusting arms 18 are secured to blades 5, and adjusting arms 27 are secured to blades 6 for turning the same, respectively, about the radial longitudinal axes of the same. Other joints, not shown, are provided for permitting a turning movement of the blades in the plane of rotation.

A first wobble plate mechanism 9 including an outer guide part 21, and an inner rotary part 23 is disposed below rotor 4, 6 and above rotor 3, 5.

A second wobble plate mechanism 8 including an outer guide part 12 and an inner rotary part 13 is located below rotor 3, 5. Wobble mechanisms 9 and 8 are respectively mounted on shafts 2 and 1 for angular tilting movement, and for axial movement.

A toggle lever means 10, 11 connects a non-rotatable support 49 with the guide plate 12 of wobble plate mechanism 8 so that guide part 12 cannot rotate during its axial or angular displacement permitted by the relative angular movement between toggle levers 10 and 11. The rotary part 13 is rotatably mounted on guide part 12, but moves with the same in axial and angular movements. Rotary part 13 rotates at the same rotary speed and in the same direction as rotor 3, 5, and performs wobbling motions during rotation when guide part 12 is tilted to the axis of shaft 1. Such wobbling motion of the rotary part 13 is used for the cyclical adjustment of the rotor blades 5.

A hydraulic motor 14, which may be replaced by any other suitable motor, is connected with the guide part 12 and with support 49 for tilting wobble plate mechanism 8 under the control of the pilot or automatic flight control apparatus.

Two diametrically disposed hydraulic motors 15 also connect support 49 with guide part 12 and can be operated in opposite directions to tilt wobble plate mechanism 8 about another axis for effecting turning of the helicopter about its longitudinal axis in a manner which is not an object of the present invention.

The three hydraulic motors 14, 15 determine the static position of the guide part 12 and are independently operable. However, if required, they can be simultaneously operated by the pilot.

Rotor part 13 of wobble plate mechanism 8 has four arms 113. Double armed control levers 22 are mounted on the arms 113 of rotary part 13 for turning movement. Links 20 are pivotally connected with the outer ends of control levers 22 by pivot pins. Two links 16 are pivotally connected to the inner arms of two diametrically disposed control levers 22 and connect the same with adjusting members 17 which are mounted for tilting movement on rotor shaft 1. An adjusting link 19 connects adjusting member 17 with adjusting arm 18 by which blade 5 is turned about its radial longitudinal axis for adjusting the pitch of the same. When control levers 22 are held immovable and blocked, and do not turn relative to the arms of rotary part 13, the wobbling motion of rotary part 13 is transmitted by links 16 to the adjusting means 17, 19, 18.

Rotor blades 5 are located in a first axial plane passing through the axis of shaft 1, and links 16 are located in a second axial plane pasisng through the axis of shaft 1 and defining an angle of 90° with the first axial plane. Consequently, the pitch adjustment of blades 5 under control of links 16 is effected at points of its circular path of rotation leading links 16 by 90°.

The rotational movement of rotary part 13 and its wobbling motion, are transmitted by links 20 to arms of the guide part 21 of the upper wobble plate mechanism 9. The lower ends of links 20 are pivotally connected to the outer ends of control levers 22. If control levers 22 are held immovable, wobble plate mechanism 9 will perform the same wobbling motions, and guide part 21 will rotate at the same rotary speed and in the same direction as rotary part 13 of the lower wobble plate mechanism 8. Since rotary part 13 is connected by links 16 and adjusting means 17, 19, to rotor 3, 5, and rotates at the same speed as rotor 3, 5, the outer guide part 21 of wobble plate mechanism 9 will rotate at the same speed and in the same direction as rotor 3, 5.

The rotary part 23 of the upper wobble plate mechanism is mounted in guide part 21 and performs wobbling motions when guide part 21 is tilted. Rotary part 23 is connected by links 24 to adjusting members 25 which are mounted for angular movement on head 4, and are connected by an adjusting link 26 to the adjusting arm 27 by which the rotor blade 6 is turned about its radial longitudinal axis for variation of the pitch. Consequently, when rotor part 23 wobbles due to tilting of guide part 21, the pitch is cyclically adjusted. Only one adjusting link and one adjusting arm are shown in the drawing, and it will be understood that corresponding adjusting means are provided for the other arms of the rotors and connected to adjusting members 17 and 25. Since rotary part 23 is connected by links 24 and adjusting means 25, 26, 27 with rotor 4, 6, rotary part 23 rotates at the same speed and in the same direction as rotor 4, 6, while guide part 21 rotates in the opposite direction at the rotary speed of rotary part 13.

The direction of flight and the turning of the helicopter about its vertical axis is controlled by the pilot, or by an automatic flight control apparatus when the hydraulic motor 28 is operated. Any motor may be used, but in the illustrated embodiment, a cylinder and piston motor is secured to the stationary support 49 and connected with an annular member 41 which engages a collar on a sleeve 42 and is mounted for axial movement along shaft 1, but is prevented from turning by a pair of toggle levers 29 and 30 which connect annular member 41 with a stationary arm on support 49. Sleeve 42 rotates with shaft 1, but is operated by motor 28 and collar 41 to move in axial direction. Levers 43 are mounted in angularly displaced positions on pivots 44 supported by sleeve 42. The angular position of levers 43 correspond to the angular positions of the arms of rotary part 13 and of control levers 22. Each lever 43 is pivotally connected with a pair of parallel links 46, 47 of which link 46 is pivotally connected at the upper end thereof to the inner end of a control lever 22, while link 47 is pivotally connected at 48 with the corresponding arm 113 of rotary part 13. Sleeve 42 is guided for movement in axial direction of a ball-shaped part 114 which is connected by toggle levers 115, 116 with rotor head 3 for rotation therewith.

If, for the purpose of a differential collective adjustment of the pitch of the rotor blades 5 and 6, sleeve 42 is shifted in axial direction by motor 28, pivots 44 are also axially displaced and cause turning of levers 43 about pivots 48 since links 47 cannot displace the arms of rotary part 13 in axial direction. Turning of levers 43 causes a turning of control levers 22 since force is transmitted by links 46 to the inner arms of control levers 22. The turning of control levers 22 causes movement of links 20 and 16 in opposite directions, since links 20 and 16 are connected to the two arms of the double armed levers 22.

Rotor blades 5 are collectively turned by the action of links 16 on adjusting means 17, 19, 18.

Links 20, moving in the opposite direction, displace guide part 21 together with the rotary part 23 of wobble plate mechanism 9, and this motion is transmitted by links 24 to a pair of adjusting members 25 pivotally mounted on head 4 and turning in opposite directions. Adjusting members 25 are connected by adjusting links 26 to adjusting arms 27 by which blades 6 are turned about radial axes for variation of the pitch. Due to the fact that links 16 and 20 move in opposite directions, a differential but collective adjustment of the rotor blades of the two rotors is obtained so that different reaction torques are produced causing a change in direction of the movement of the helicopter.

In order to collectively adjust the pitch of the blades 5 and 6 of both rotors in the same sense, mechanisms 8 and 9 must be shifted together upward or downward in axial direction while remaining parallel to each other. During such movement, links 16 effect through adjusting means 17, 19, 18 a pitch variation of blades 5 in the same sense as accomplished by the movement of links 20 acting through wobble plate mechanism 9 and links 24 on the adjusting means 25, 26, 27 of the upper rotor blades.

The hydraulic motors 14, 15 and 28 are simultaneously displaced in axial direction, for example by axial shifting of support 49 under the control of the pilot, or of an automatic altitude control device. Supporting part 12 and rotary part 13 of wobble plate mechanism 8 are displaced in axial direction without being tilted to the axis of the rotor shafts. Since the actuating means 28, 41, 42, 44, 43, 46, 47 are not moved relative to wobble plate mechanism 8, control levers 22 cannot turn on the arms of rotary part 13. Consequently, the axial movement of wobble plate mechanism 8 causes simultaneous axial displacement of all links 16 and 20 in the same direction, and in the above described manner, the rotor blades 5 and 6 are simultaneously adjusted by adjusting means 17, 19, 18 and 25, 26, 27. During the axial movement of wobble plate mechanism 8, sleeve 42 of the actuating means moves together with supporting part 49 in axial direction since the piston of hydraulic motor 28 does not move in its cylinder or all pistons of hydraulic motors 14, 15 and 28 move alike.

Hydraulic motors 15 and 14 are used in a known manner to tilt the wobble plate mechanism 8, and such tilting movement is transmitted by links 20 to the upper wobble plate mechanism 9, and by links 16 to the adjusting means for rotor 3, 5. From the description it becomes apparent that the actuating means include a motor 28, and motion transmitting means 41, 42, 43, 44, 46 and 47. Links 46 and 47 are respectively connected with control levers 22 and the arms of the rotary part 13 of wobble plate mechanism 8 at one end, and to levers 43 at the other ends. First linkage means 20 connect control means 22 with guide part 21 of wobble plate mechanism 9, and second linkage means 16 connect control means 22 with the adjusting means 17, 19 for blades 5. The adjusting means 25 to 27 for the upper rotor are connected by link means 24 with the rotary part 23 and thereby with guide part 21 for axial and angular movement. When relative movement between control means 22 and rotary part 13 is blocked by the actuating means, wobble plate mechanism 8 can be axially displaced by operating means 49, while linkage means 20 and 16 simultaneously increase or decrease the pitch of the first and second blades 6 and 5.

However, when the motor 28 of the actuating means is operated, control means 22 are moved relative to rotary part 13, and cause opposite movements of the first linkage means 20 and second linkage means 16 so that the pitch of blades 6 is increased while the pitch of the blades 5 is decreased, or the pitch of blades 6 is decreased while the pitch of blades 5 is increased.

Evidently, the control means 22 are not necessarily levers, as illustrated and described, but must be mounted on the rotary part 13 to permit a relative movement between the first linkage means 20 and the second linkage means 16 between each other, and the rotary part 13. Instead of two rotor blades, a greater number may be provided, in which event a greater number of linkage means 20 and 16 is required.

It will be understood that each of the elements described above, or two or more together, may also find a useful application in other types of pitch control apparatus for the rotor blades of a helicopter differing from the types described above.

While the invention has been illustrated and described as embodied in actuating means for effecting differential collective pitch adjustment of the blades of two coaxial rotors rotating in opposite directions, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rotary wing aircraft including coaxial counterrotating first and second rotors including first and second concentric counterrotating shafts and first and second blade means respectively mounted for turning pitch adjustment movement, and first and second adjusting means for adjusting the pitch of said first and second blade means, respectively, in combination, pitch control apparatus located outside of said shafts and comprising first and second wobble plate mechanisms respectively including first and second guide parts mounted for angular movement, and first and second rotary parts rotatably mounted in said first and second guide parts, respectively, for angular movement with the same; means connecting said first rotary part and thereby said first guide part with said first adjusting means for movement; first linkage means connected with said first guide part; second linkage means connected with said second adjusting means; control means pivotally mounted on said second rotary part and connecting said first and second linkage means; operating means connected with said second guide part for tilting the same with said second rotary part and said control means; and actuating means connected with said control means and having a first position blocking pivotal movement of said control means relative to said second rotary part so that said operating means move said second guide part, said second rotary part, said control means and said first and second linkage means together whereby said operating means simultaneously operate said first and second adjusting means to simultaneously increase or decrease the pitch or said first and second blade means, said actuating means being movable to a second position for releasing and angularly displacing said control means so that said first and second linkage means are moved by said control means in opposite directions whereby said first and second adjusting means are simultaneously operated to increase, or decrease, respectively, the pitch of said first blade means while decreasing, or increasing, respectively, the pitch of said second blade means.

2. Pitch control apparatus according to claim 1 wherein said control means include control lever means mounted on said second rotary part for pivotal movement and being pivotally connected with said first and second linkage means; wherein said actuating means in said first position block pivotal movement of said control lever means on said second rotary part so that said first and second linkage means are rigidly connected by the same; and wherein said actuating means moving to said second position turn said control lever means on said second rotary part thereby to move said first and second linkage means in opposite directions.

3. Pitch control arrangement according to claim 1 wherein said control means include double-armed control lever means mounted on said second rotary part for angular movement and being pivotally connected with said first and second linkage means; and wherein said actuating means include motor means and motion transmitting means connecting said motor means with said control lever means so that the same are turned for moving said first and second linkage means in opposite directions.

4. Pitch control arrangement according to claim 3 wherein said motion transmitting means include an actuating member mounted for movement in axial direction of said second rotor and turning with the same, lever means mounted on said actuating member for turning movement, and a pair of links connecting said lever means with second rotary part and with said double armed control lever means, respectively, so that upon displacement of said actuating member by said motor, said lever means causes relative movement between said last mentioned links and angular displacement of said double armed control lever means on said second rotary part.

5. Pitch control arrangement according to claim 3 and wherein said second rotary part has a plurality of radial arms, wherein said double armed control lever means include a plurality of double armed control levers respectively pivotally mounted on said arms; wherein said first linkage means include a plurality of first links connecting said first guide part with said control levers, respectively; and wherein said second linkage means include a plurality of second links connecting said second adjusting means with said control levers, respectively.

6. Pitch control arrangement according to claim 3 and wherein said second rotary part has a plurality of radial arms, wherein said double armed control lever means include a plurality of double armed control levers respectively pivotally mounted on said arms; wherein said first linkage means include a plurality of first links connecting said first guide part with said control levers, respectively; wherein said second linkage means include a plurality of second links connecting said second adjusting means with said control levers, respectively; wherein said motion transmitting means include an actuating member mounted for movement in axial direction of said second rotor and turning with the same, lever means mounted on said actuating member for turning movement, and a pair of links connecting said lever means with said second rotary part and with said double armed control lever means, respectively, so that upon displacement of said actuating member by said motor, said lever means causes relative movement between said last mentioned links and angular displacement of said double armed control levers on said second rotary part.

7. Pitch control arrangement according to claim 6 including a shaft for carrying said second rotor and passing through said second rotary part; wherein said actuating member is a sleeve mounted for axial movement and nonturnable on said shaft and connected with said motor; wherein said lever means are a plurality of levers mounted for pivotal movement on said sleeve and having free end portions; and wherein a pair of said links is pivotally connected with each said end portion, one link of each pair, respectively, being connected with different control levers, and the other link of each pair, respectively, being connected with different arms of said second rotary part.

8. Pitch control arrangement according to claim 6 wherein said first and second links and said control levers are located in an axial plane passing through the axis of rotation of said second rotor; and wherein said second blade means are located in an axial plane angularly spaced from said plane an angle of 90°.

References Cited

UNITED STATES PATENTS

| | | | |
|---|---|---|---|
| 2,256,918 | 9/1941 | Young | 170—135.26 |
| 2,448,073 | 8/1948 | Bendix | 170—135.26 X |
| 2,486,059 | 10/1949 | Pentecost | 170—135.26 X |
| 2,587,104 | 2/1952 | Bréguet | 170—135.24 |

EVERETTE A. POWELL, JR., *Primary Examiner.*

U.S. Cl. X.R.

170—135.28